United States Patent [19]

Vinding

[11] Patent Number: 4,536,740

[45] Date of Patent: Aug. 20, 1985

[54] DOUBLET DETECTOR FOR DATA RECORDING OR TRANSMISSION

[75] Inventor: Jorgen P. Vinding, Monte Sereno, Calif.

[73] Assignee: Magnetic Peripherals, Minneapolis, Minn.

[21] Appl. No.: 583,476

[22] Filed: Feb. 24, 1984

[51] Int. Cl.³ .......................................... H03K 17/00
[52] U.S. Cl. ............................ 340/347 DD; 360/39; 307/231; 328/114; 328/115
[58] Field of Search .................................. 360/39–44; 340/347 DD; 307/231; 328/114, 115

[56] References Cited

U.S. PATENT DOCUMENTS 3,631,263  12/1971  Graham et al. ..................... 328/115
4,135,161   1/1979  Torrieri .............................. 328/114
4,255,742   3/1981  Gable et al. .................. 340/347 DD

OTHER PUBLICATIONS

IBM Tech. Disc. Bull., vol. 14, No. 4, Sep. 1971, pp. 1168-1169 —Detection in Readback Circuits.

Primary Examiner—Bernard Roskoski
Attorney, Agent, or Firm—Edward L. Schwarz; Joseph A. Genovese

[57] ABSTRACT

A data recovery circuit useful in magnetic data recording systems employs doublet pulses to at least partially encode data. Measurement of the slope of the transition between doublet pulse half-cycle peaks and of the amplitude of this transition allows rejection of high frequency low amplitude noise and high amplitude low frequency noise. The use of nearly the entire peak-to-peak voltage swing of doublet pulses makes identifying them relatively reliable.

4 Claims, 2 Drawing Figures

DOUBLET DETECTOR FOR DATA RECORDING OR TRANSMISSION

BACKGROUND OF THE INVENTION

In data recording and transmission a multitude of improvements in all areas of the technology have contributed to drastic reductions in the cost of recording or transmitting an individual bit. Among the areas providing this contribution is that related to the encoding and decoding of the data involved. There have been a number of coding techniques developed that have progressively reduced the number of flux reversals or signal changes necessary for each information bit involved. The problem has always been complicated by the fact that the data itself must contain enough clock information so that the readback or receiving circuitry can synchronize with the data being read back or received in the face of noise and gradual frequency variations in the data. In these codes, individual flux reversals or signal changes create a continuous output signal, with the information content present in the time of individual reversals.

One of the most efficient ways of encoding such data is known as ternary encoding, which is characterized by two classes of signal elements, singlet pulses and doublet pulses. It is convenient to consider the frequency of the data clock for ternary encoding as being established by a single cell time. A singlet pulse is generated by a single, relatively isolated, flux or signal transition occupying at least 3 cell times, the polarity of each singlet pulse on readback being opposite that of the previous singlet. The polarity of a singlet pulse is established by the direction in the medium or channel of the flux reversal or signal change, which generates the singlet pulse during readback. A doublet pulse comprises 2 flux reversals of opposite polarity spaced 1 cell time apart, whose mutual interference create a pulse of at least 4 cell times and create 2 closely spaced peaks of opposite polarity with a zero crossing transition between them. For purposes of synchronizing these pulses in the clock in the readback circuitry, a singlet pulse is considered to occur in the middle of the 3 pulses which it occupies, while a doublet is considered to occur at the zero crossing between the 2 opposite polarity peaks which form it. Because each doublet is formed of 2 flux reversals of opposite direction, it is clear that the flux reversals for successive singlets are of opposite polarity regardless of the number of doublets interposed between them.

Although the original flux reversals during writing which create the pulses on readback are nominally of the same strength, the greater spacing between each singlet and adjacent pulses than between half-cycles of a doublet causes each singlet on readback to have substantially greater duration and magnitude than a doublet half-cycle. This makes reliable detection of a singlet much easier than detection of a doublet.

Noise and pulse crowding can cause doublets to be improperly detected. A known way of screening out some of the false zero crossings created by noise is, during signal processing, to compare the slope of the transition portion of a doublet between the peaks, with the polarity of the most recent singlet. One can see that the polarity of this slope and the most recent singlet should be the same. It is possible, however, that noise in the readback signal can occasionally cause data to be read back falsely with compatible slope polarity, and hence produce errors.

It should be understood that many types of ternary codes can be devised, all having a different relationship with respect to the sequence of singlet and doublet pulses and the spacing between them. In fact, a typical ternary code may permit as many as 8 cell times between the actual time of arrival of 2 adjacent pulses, singlet or doublet. It is particularly during these gaps that noise can intrude to cause the readback errors mentioned.

It should also be understood that other types of data encoding may employ doublets. For example, vertical recording techniques use only doublet pulses to carry information, making reliable detection of these pulses even more critical.

As to prior art, U.S. Pat. No. 3,631,263 (Graham et al.) discloses apparatus which is related to the invention to be disclosed, but which solves a somewhat different problem. In the Graham et al. patent, peak detection in combination with peak-to-peak voltage transition discrimination is used to reject noise having relatively small peak-to-peak transitions.

BRIEF DESCRIPTION OF THE INVENTION

I confirm that many errors are caused by such low amplitude noise wave forms with relatively steep transitions between positive and negative peaks. The slope of these transitions is frequently similar to that of a legitimate doublet. However, in the encoding schemes discussed above, noise which may mimic a doublet may also have peaks whose amplitudes are similar to that of a true doublet, but wherein the transition time between these peaks is relatively long. The invention to be described herein employs circuitry which not only rejects low amplitude noise with steep wave fronts, but also rejects high amplitude noise with a more sloping transition between the peaks. In addition, the circuitry is designed such that it uses a substantial percentage of the transitions between peaks in determining slope and amplitude, thereby still further reducing sensitivity to noise. All this is accomplished by proper selection of the individual functional elements of the detector circuitry.

In the invention to be described, an equalized data signal is supplied to a differentiator which provides a signal having a waveform following, with a predetermined inherent delay time, the time derivative of the equalized data signal. (By "equalized data signal" is meant one whose pulses have been narrowed and made more symmetric.) First comparator means receive the differentiator output and provide as an output a logic level signal which has first, second and third instantaneous states indicating that the differentiator signal is respectively less than, within, or greater than a first predetermined signal range whose minimum corresponds to an equalized data signal slope smaller (i.e. steeper) than a first predetermined negative slope, and whose maximum corresponds to a slope greater (steeper) than a second predetermined positive slope.

An amplifier also receives the equalized data signal, but with a delay, and supplies an amplified output signal having a waveform following the equalized data signal and delayed by a predetermined time therefrom. Since differentiators have the inherent delay in them referred to, this delay is necessary to synchronize the amplifier output with the differentiator output. The delay in the amplifier output is inserted by a delay element receiving the equalized data signal and supplying the delayed, equalized data signal to the amplifier.

Analog gate means which receive the amplifier and first comparator means outputs supply an output signal including a first portion following the amplifier signal while the first comparator means output signal has exclusively its first state and a second portion following the amplifier signal while the first comparator means output signal has exclusively its third state. Each gate means output signal portion is clamped to a predetermined voltage level otherwise.

Second comparator means receiving the output of the analog gate means produce responsive thereto a logic level signal having first, second and third instantaneous states, said first state and said third state of the second comparator means indicating respectively that the first portion and the second portion of the analog gate means output are outside a second predetermined signal range. The second state of the second comparator means indicates that both first and second portions of the analog gate means output are within the second predetermined signal range. This second predetermined range substantially corresponds to the minimum excursion of the equalized data signal between points on it (i) having slopes corresponding to the first and second predetermined slopes and (ii) between peaks of a valid doublet pulse.

This circuitry, while the equalized data signal slope exceeds a certain steepness as indicated by the derivative falling below the first signal range minimum or above the first signal range maximum, measures the voltage excursion during this interval. If it exceeds the minimum which can be expected for a valid doublet for the particular recording system involved, then it can be assumed to be the transition between the peaks of a valid doublet rather than noise. (In the ternary encoding case, adjacent singlets will be detected as a valid doublet by this circuit also, but these can easily be identified as singlets and the system caused to ignore this circuit's output.) Use of the components described above allow the signal measurements described with a minimum of elements required.

Accordingly, a first purpose of this invention is to reject potential doublet waveforms whose transition between peaks does not have sufficient steepness.

A second purpose is to reject potential doublet waveforms whose voltage excursion between points which have at least the required steepness is not sufficiently great.

Yet another purpose is to employ as much of the voltage transition between peaks as can be reasonably done.

Yet another purpose is to perform this processing with a minimum number of circuit elements.

A further purpose is to allow easy selection or control of the steepness of a valid doublet transition and the minimum permissible voltage change in that transition.

Other purposes of this invention will become apparent in the following description.

DESCRIPTION OF THE PREFERRED EMBODIMENT

Figure 1:
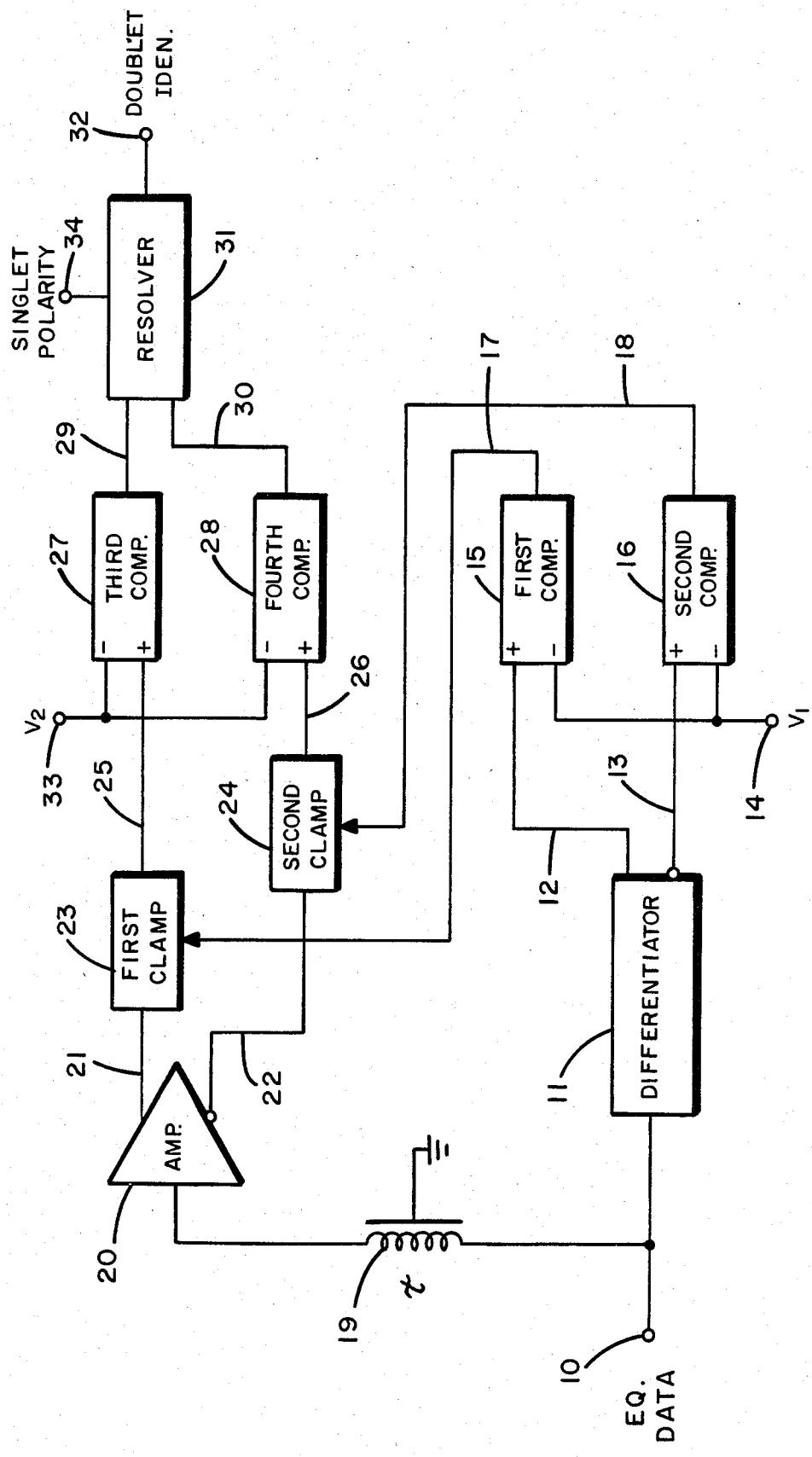
FIG. 1 is a diagram of a circuit mechanizing the invention, and formed of functional elements commonly available in off-the-shelf form.

Turning first to FIG. 1, equalized data (as defined above) is applied to an input terminal 10. A differentiator 11 receives it and produces an output having a true, or normal, value on signal path 12 and a value on signal path 13 inverted with respect to, and synchronized with, the signal on path 12. The signal on path 12 is a waveform which follows the time derivative of the equalized data. That is, it crosses zero (or a predetermined baseline) at peaks of the equalized data, and reaches maximums and minimums, respectively, as the slope of the equalized data signal is respectively greatest, i.e. most positive, and least, i.e. most negative.

Figure 2:
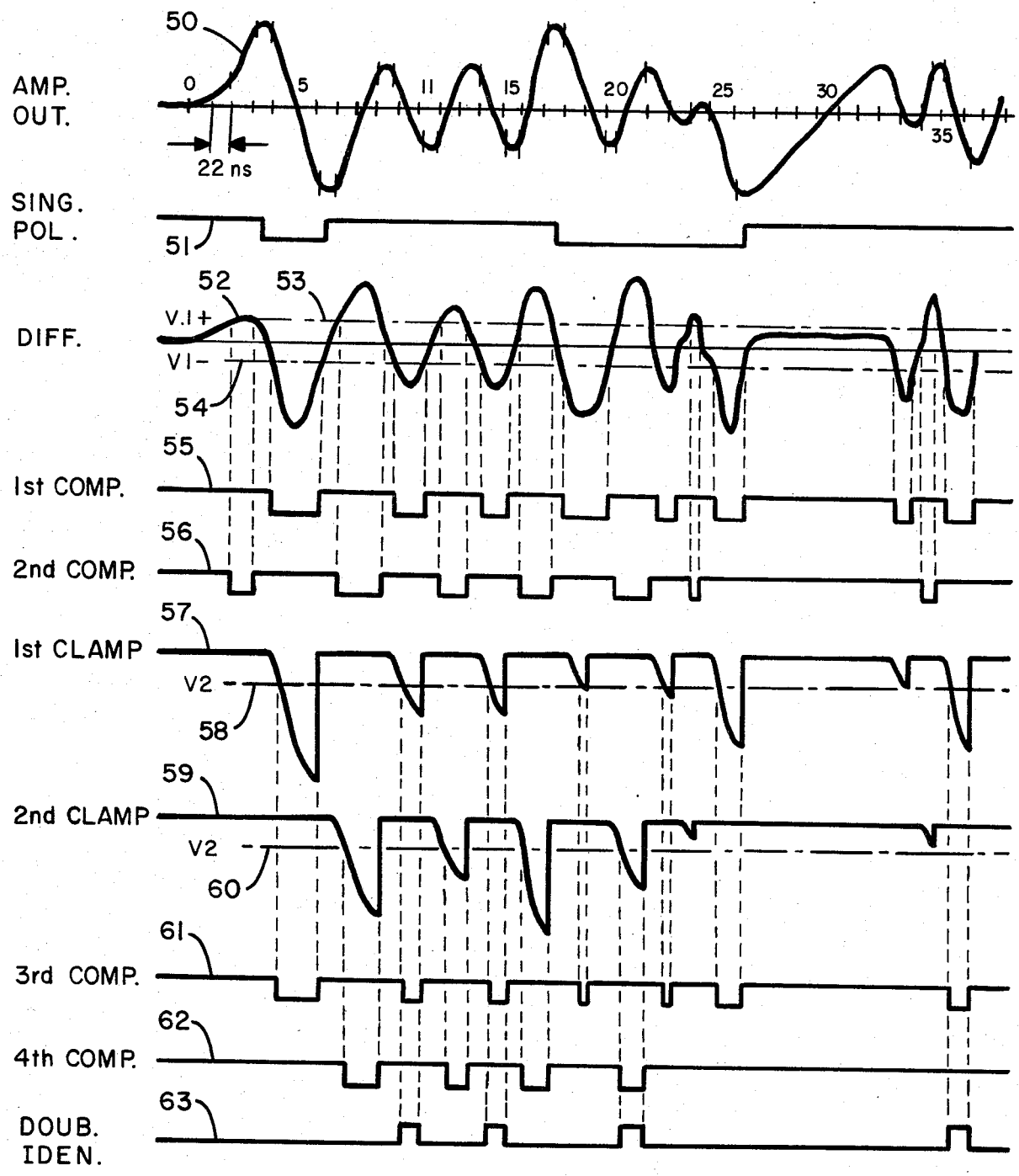
FIG. 2 comprises a number of waveforms useful in describing the circuit of FIG. 1.

Turning to FIG. 2, equalized data is shown by waveform 50, labeled AMP. OUT. To aid in the description of various portions of this waveform individual cell times have been numbered, starting with 0 and running up to 35. References to portions of each waveform, will be in terms of the number assigned to the individual cell time, and individual references to an interval of several adjoining cell times will always be inclusive, i.e. the interval mentioned will run from the first mentioned cell time number to the last. As indicated in waveform 50, an individual cell time has a 22 ns. duration in a preferred system for which this circuit has been proposed.

To simplify understanding of the waveforms in FIG. 2, the equalized data signal applied to terminal 10 is shown as time delayed. Waveform 50 is, in fact, identical to the signal at terminal 10 but delayed with respect to it by delay element 19 and amplifier 20. Waveform 50 reproduces the signal on path 21. Delay element 19 preferably has the delay interval inherent in differentiator 11. More precisely it should produce a delay equal to the difference between the differentiator 11 delay plus the first (or second) comparator 15 delay less the amplifier 20 delay. The signal issuing from delay element 19 is applied to the input of amplifier 20. The output of amplifier 20 (waveform 50) is therefore delayed with respect to the equalized data signal at terminal 10. Thus, the signal output from amplifier 20 on signal path 21 is substantially synchronized with the derivative signal shown as waveform 52 labeled DIFF. (and all other waveforms in FIG. 2 as well) and carried on path 12.

The true and inverted outputs of differentiator 11 are applied on paths 12 and 13 to the plus input terminals of first and second comparators 15 and 16, respectively. Comparators 15 and 16 (and third and fourth comparators 27 and 28, respectively also) are standard circuit elements having inputs conventionally labeled with plus and minus signs. When the voltage at a comparator plus input terminal exceeds that at its minus input terminal, a high logic level is produced at its output terminal, connected to path 17 in the case of first comparator 15. When the voltage level at a comparator plus input terminal is less than that at the associated minus input terminal, then a logic low level is produced at its output.

A constant voltage $V_1$, a small negative value in the circuit of FIG. 1, is applied to the minus input terminals of first and second comparators 15 and 16. Voltage $V_1$ is selected to correspond to an equalized data signal slope greater than a predetermined negative slope insofar as it is applied to the minus input terminal of the first comparator 15, for comparator 15 carries the derivative value involved with processing portions of the equalized data waveform having negative slopes. $V_1$ voltage line 54 negatively displaced from the baseline represents the relationship of the true derivative signal on path 12 to $V_1$. Similarly, voltage $V_1$, as applied to the minus input terminal of second comparator 16, corresponds to an equalized data signal slope which is greater, i.e., more positive, than a first predetermined positive slope, since second comparator 16 is involved with processing equalized data signal transitions having positive slopes. This seemingly confusing situation results from the fact that second comparator 16 receives an inverted derivative signal from differentiator 11. A similar predetermined voltage of identical magnitude is shown as $V_1+$ voltage line 53 but having a positive displacement from the baseline. (It is easiest to illustrate the operation of second comparator 16 and the inverted differential on signal path 13 by simply assuming the reference voltage $V_1$ has a positive value and performing the analysis of the second comparator's operation on that basis, as shown in waveform 52.

Referring to FIG. 2, the pulses in waveform 50 occurring in cell times 0–4 and 5–7 are both singlet pulses, shown simply for purposes of comparison. Singlet pulses are substantially larger than doublet pulses, as mentioned earlier.

The two pulses which extend from the last half of cell time 8 through the first half of cell time 12 comprise the first doublet, and for purposes of this analysis form a valid doublet. The peak-to-peak transition occupying all of cell 10 is therefore the first valid doublet transition. As can be seen, this transition has a negative slope. True derivative waveform 52 on path 12 accordingly shows a negative peak coinciding with this time. Voltage $V_1$ (having a small negative value) applied by terminal 14 to minus input terminal of first comparator 15 and shown by constant voltage line 54, causes the output of first comparator 15 to change from a logic high to a logic low level around cell 10's start because plus input terminal of comparator 15 has become more negative than $V_1$ at this time, as shown in 1st COMP. waveform 55. By way of further explanation, the positive-going voltage transition passing through cell 12 is applied in an inverted form via signal path 13 to the positive input terminal of second comparator 16, and hence causes the plus input terminal of second comparator 16 to fall below the voltage at its minus input terminal connected to predetermined reference voltage $V_1$ at approximately the start of cell 12. At this instant, the logic level output in second comparator (2d COMP.) waveform 56 on path 18 changes from a logic high level to low. Thus, a first predetermined signal range for the time derivative signal waveform 52 is in effect created by this arrangement running from $-V_1$ to $+V_1$, or $-0.1$ v. to $+0.1$ v. for the preferred circuit. A first state of comparators 15 and 16 output is defined as waveforms 55 and 56 having low and high logic levels respectively. A third state comprises waveforms 55 and 56 having high and low logic levels respectively, and a second state exists when both waveforms 55 and 56 are high.

The output of first comparator 15 and second comparator 16 are carried by signal paths 17 and 18, respectively, to the control terminals of first clamp 23 and second clamp 24. The input terminals of first and second clamps 23 and 24, respectively, receive the true delayed equalized data signal waveform 50 on signal path 21 and an inverted delayed and equalized data signal waveform 50 on path 22 synchronous with the signal on path 21. First and second clamps 23 and 24 function in concert as an analog gate means which provide output on paths 25 and 26, respectively, which is clamped (hence the name) to a characteristic clamp voltage level (+1.25 v. in one preferred embodiment) when the control voltage on the terminals attached to paths 17 and 18, respectively, is the high logic level, and follows the input voltage change on path 21 or 22 when the voltage on the control terminal involved is the low logic level. For example, considering again the waveform 50 transition passing through cell 10, the first comparator 15 output shown in waveform 55 has a low logic level (first state for comparator 15 and 16 output) and the 1st CLAMP waveform 57 for first clamp 23 output during cell 10 follows the voltage transition for waveform 50, ramping downwardly until the derivative on signal path 12 becomes more positive than reference voltage level $V_1$, whereupon the output of first clamp 23 is pulled up to the characteristic clamp voltage level. Similarly, for the transition passing through cell 12, the plus input terminal of second comparator 16 becomes more negative than its corresponding minus input terminal, so that the corresponding low logic level in waveform 56 of second comparator 16 (third state for comparators 15 and 16 output) allows second clamp 24 output on path 26 to follow the change in the inverted equalized data signal on path 22 during this interval, as shown by the corresponding portion of 2d CLAMP waveform 59. Thus, one can see that either one or the other of clamps 23 and 24 are unclamped, or both are clamped, for the simple reason that a waveform cannot have negative and positive slopes at the same time.

The outputs of first and second clamps 23 and 24 are respectively applied on signal paths 25 and 26 to the plus input terminals of third and fourth comparators 27 and 28. Minus input terminals of third and fourth comparators 27 and 28 receive from terminal 33 a second reference voltage $V_2$. For analyzing the operation of third and fourth comparators 27 and 28, reference voltage $V_2$ is shown as $V_2$ voltage lines 58 and 60 in the waveforms 57 and 59 for first and second clamps 23 and 24, respectively. For clamps of the type described, which clamp to a $+1.25$ v. level, it is preferable to use a second reference voltage $V_2$ equal 0 v. Thus, a 1.25 v. excursion in the output of either first clamp 23 or second clamp 24 is necessary for waveform 57 or 59 to cross (in the negative direction) its corresponding reference voltage $V_2$. Thus, a second predetermined signal range is created running from $V_2$ to above the characteristic clamp voltage. If the voltage change gated by either clamp 23 or 24 swings below this second predetermined range, the associated comparator 27 or 28 will respond.

Recalling that third and fourth comparators 27 and 28 function identically to first and second comparators 15 and 16, therefore when either waveform 57 or 59 is more positive than reference voltage $V_2$, the output of third comparator 27 or fourth comparator 28 is a high logic level. Considering again the voltage transition through cell 10 of waveform 50, once the voltage from first clamp 23 on signal path 25 falls below voltage $V_2$, then the corresponding output of third comparator 27 is shown in 3d COMP. waveform 61, changes from a high logic level to a low logic level and maintains a low level for the time interval during which this voltage relationship at the input terminals of third comparator 27 exists. Similarly, when the signal on path 26 from second clamp 24 as shown in waveform 59 falls below voltage $V_2$ in cell 12 and adjacent to it, output of fourth comparator 28 becomes a low logic level during this interval and producing the corresponding pulse shown in 4th COMP. waveform 62. Therefore, the output from third and fourth comparators 27 and 28 have essentially three different states in combination, a first state when the logic level of waveform 61 is low and waveform 62 is high, a second value when both are high logic levels, and a third when the waveform 61 logic level is high and waveform 62 is a low logic level. In essence, third and fourth comparators 27 and 28 produce high logic voltage levels while their respective clamp output voltages are nearer to the characteristic clamp voltage than is $V_2$, and a low logic level otherwise. The output signals from comparators 27 and 28 therefore contain sufficient information to identify individual portions of the equalized data signal as constituting valid doublets. This is the doublet identification signal desired.

Resolver 31 receives the output of third and fourth comparators 27 and 28 on signal paths 29 and 30, respectively. and a waveform indicating the singlet polarity shown by waveform 51. For the example shown, since the latest singlet preceding the voltage transition in the equalized data signal at cell 12 is negative, therefore only doublet peak-to-peak transitions having a negative slope are valid. Therefore, the doublet identifier signal produced by resolver 31 at terminal 32 and shown as DOUB. IDEN. waveform 63 in FIG. 2, has a corresponding pulse at cell 10. The transition from a negative to positive peak passing through cell 12 has a positive slope and therefore, is opposite that of the latest singlet pulse. Therefore, resolver 31 does not produce a pulse corresponding to the low pulse at cell 12 in waveform 62.

To illustrate how this circuit rejects high frequency, low amplitude noise, consider such noise occupying cells 23 and 24. Waveform 50 at the beginning of cell 24 has a slope for which waveform 52 exceeds $V_1$, and hence a corresponding low logic level pulse is shown in waveform 56. However, the voltage swing in waveform 50 during the time that waveform 52 exceeds $V_1$ is so small that waveform 59 never falls below voltage $V_2$, i.e., outside of the second predetermined range. Accordingly, the fourth comparator 28 output shown in waveform 61 does not change from a high to a low logic level in this interval. Therefore, doublet identifier waveform 63 does not produce a doublet-indicating pulse.

The portion of waveform 50 occupying cells 26 to 32 illustrates the capability of this circuit to deal with and reject high amplitude low frequency noise. The peak-to-peak transition in waveform 50 occupying cells 26 to 32 has a voltage excursion sufficient to appear to be a valid doublet. Furthermore, its slope, positive, corresponds to the polarity of the most recent singlet, which occurred during cells 16 to 18. However, the slope, as shown in waveform 52, never becomes great enough to reach voltage $V_1$; hence, second comparator 16 does not enable second clamp 24 to gate this transition to fourth comparator 28. Accordingly, no corresponding pulse is produced by fourth comparator 28, and the doublet identifier waveform 63 contains no pulse signifying occurence of a doublet during this interval.

As a further illustration, considering the voltage transition occupying cell 33. This transition also has sufficient negative slope to cause first comparator 15 to enable first clamp 23. However, the voltage transition in waveform 50 is insufficient to cause waveform 57 to fall below voltage $V_2$, and, therefore, this transition is removed from further consideration as a valid doublet transition. A similar analysis can be made for the transition occupying the major portion of cell 35. Unlike that occupying cell 33, the slope of this transition is of the same polarity as the most recent singlet (cell 17) and hence, if the level of second clamp 24 output as shown in waveform 59, fell below voltage $V_2$, a valid doublet would be indicated as having occurred. However, in this case, the small voltage swing between the peak occurring in cell 34 and that occurring in cell 35 is not sufficient to trigger a low logic level from fourth comparator 28.

One should realize that many different relationships between the characteristic voltage levels for the components involved are possible. For certain off-the-shelf devices now available and incorporated in the circuit just described, these voltage levels neatly complement each other, as shown.

Having thus described the operation of a device embodying my invention, my desire to protect same by letters patent is embodied in the following claims:

I claim:

1. In a data recording/transmission system wherein information is encoded in an equalized data signal comprising at least partly doublet pulses, each valid doublet pulse comprising two adjacent opposite polarity pulses, an improved circuit for distinguishing individual doublets from noise in the equalized data signal, said circuit receiving the equalized data signal, and responsive thereto supplying a doublet identification signal identifying individual portions of the equalized data signal as constituting doublets, and comprising:
    (a) a differentiator receiving the equalized data signal and providing a signal having a waveform following the time derivative of the equalized data signal, and having a predetermined delay time;
    (b) first comparator means receiving the differentiator output for providing as an output a logic level signal having first, second, and third instantaneous states indicating that the differentiator output signal is respectively less than, within, or greater than a first predetermined signal range whose minimum corresponds to an equalized data signal slope smaller than a first predetermined negative slope, and whose maximum corresponds to a slope greater than a second predetermined positive slope;
    (c) an amplifier receiving a delayed equalized data signal and supplying an amplified output signal having a waveform following the equalized data signal and delayed by a predetermined delay time therefrom;
    (d) a delay element receiving the equalized data signal, and supplying the delayed equalized data signal to the amplifier;
    (e) analog gate means receiving the amplifier and first comparator means outputs for supplying an output signal including a first portion following the amplifier signal while the first comparator means output signal has exclusively its first state and a second portion following the amplifier signal while the first comparator means output signal has exclusively its third state, each portion having a predetermined level otherwise; and
    (f) second comparator means receiving the output of the analog gate means for producing responsive thereto, a logic signal having first, second, and third instantaneous states, said first state and said third state of the second comparator means indicating, respectively, that the first portion and the second portion of the analog gate means output are outside a second predetermined signal range, and said second state of the second comparator means indicating that both first and second portions of the analog gate means output are within the second predetermined range, said second predetermined signal range substantially corresponding to the minimum excursion of the equalized data signal between points (i) having slopes corresponding to the first and second predetermined slopes and (ii) between peaks of a valid doublet pulse, the output of said second comparator means comprising the doublet identification signal.

2. The circuit of claim 1, including a first voltage source with a fixed output having a predetermined relationship with the first and second predetermined slopes, and a second voltage source having a fixed output with a predetermined relationship with the second predetermined range; and (a) wherein the differentiator comprises a differentiator producing a voltage signal having a true waveform following the time derivative of the equalized data signal and a waveform inverted with respect to the true waveform and synchronous therewith;

(b) wherein the first and second comparator means comprise first and second comparators and third and fourth comparators respectively, each comparator having first and second input terminals and an output terminal producing first and second logic voltage levels according as a voltage applied to the first input terminal is respectively more or less positive than a voltage applied to the second input terminal, said first and second comparators having substantially the same delay time and said third and fourth comparators having substantially the same delay time, wherein the output of the first voltage source is connected to the first input terminals of the first and second comparators and wherein the true and inverted waveforms of the differentiator are applied to the second input terminals of the first and second comparators, respectively;

(c) wherein the amplifier comprises an amplifier producing the amplified output signal and having a true waveform following the equalized data signal and delayed by the predetermined delay time therefrom, and a waveform inverted with respect to the true waveform and synchronous therewith;

(d) wherein the analog gate means comprises first and second clamp circuits respectively receiving the true and inverted waveform outputs from the amplifier at a signal input terminal of each, and receiving at a control terminal of each the output of the first and second comparators respectively, each said clamp circuit in response to the second logic voltage level at its control terminal clamping its output voltage at a predetermined characteristic value, and responsive to the first logic voltage level at its control terminal, causing its output voltage to follow the input voltage; and (e) wherein the third and fourth comparators receive at their second terminals the output of respectively the first and second clamp circuits, and at their first terminals the output of the second fixed voltage source, and responsive thereto the third and fourth comparators supply respectively output signals having second logic voltage levels while the first and second clamp output signal voltages respectively are nearer the predetermined characteristic clamp circuit output voltage than is the second fixed source output voltage and first logic voltage levels otherwise.

3. The circuit of claim 2 wherein the delay element includes a delay mechanism producing a delay equal to the difference between the differentiator delay plus the first comparator delay, less the amplifier delay.

4. The circuit of claim 1, wherein the delay element includes a delay mechanism producing a delay equal to the difference between the differentiator delay plus the first comparator means delay, less the amplifier delay.

* * * * *